(12) United States Patent
Harada et al.

(10) Patent No.: US 7,473,521 B2
(45) Date of Patent: Jan. 6, 2009

(54) COMPOSITE MASK FOR PRODUCING A DIFFUSER

(75) Inventors: Takamasa Harada, Kikari Inzai-machi (JP); Fumio Kita, Wiesbaden (DE); Andreas Zimmermann, Griesheim (DE); Andreas Altherr, Spiesen-Elversberg (DE); Martin Mennig, Quierschied (DE); Peter W. Oliveira, Saarbruecken (DE); Helmut Schmidt, Saarbruecken-Guedingen (DE)

(73) Assignee: Tomoegawa Co., Ltd., Tokyo (JP)

( * ) Notice: Subject to any disclaimer, the term of this patent is extended or adjusted under 35 U.S.C. 154(b) by 464 days.

(21) Appl. No.: 10/497,766

(22) PCT Filed: Dec. 6, 2002

(86) PCT No.: PCT/EP02/13846

§ 371 (c)(1),
(2), (4) Date: Jun. 4, 2004

(87) PCT Pub. No.: WO03/050574

PCT Pub. Date: Jun. 19, 2003

(65) Prior Publication Data

US 2005/0008846 A1    Jan. 13, 2005

(30) Foreign Application Priority Data

Dec. 13, 2001  (DE)  ................ 101 61 200

(51) Int. Cl.
*G02B 5/02* (2006.01)

(52) U.S. Cl. ................ 430/321; 359/599
(58) Field of Classification Search ........... None
See application file for complete search history.

(56) References Cited

U.S. PATENT DOCUMENTS

| 4,368,245 A | * | 1/1983 | Bayer ............... 430/5 |
| 5,654,090 A | | 8/1997 | Kayanoki |
| 5,858,077 A | | 1/1999 | Kayanoki |
| 5,903,391 A | * | 5/1999 | Toshima et al. ....... 359/599 |
| 6,008,285 A | | 12/1999 | Kasemann et al. |
| 6,228,921 B1 | | 5/2001 | Kasemann et al. |
| 6,236,493 B1 | | 5/2001 | Schmidt et al. |
| 6,291,070 B1 | | 9/2001 | Arpac et al. |
| 2003/0096198 A1 | * | 5/2003 | Wong et al. ........ 430/321 |

FOREIGN PATENT DOCUMENTS

| DE | 195 11 627 | | 10/1995 |
| DE | 197 19 948 | | 11/1998 |
| EP | 0 671 638 A | * | 9/1995 |
| JP | 56-017339 A | * | 2/1981 |
| JP | 09-222504 | | 8/1997 |
| WO | WO 94/29768 | | 12/1994 |
| WO | WO 95/13326 | | 5/1995 |
| WO | WO 97/38333 | | 10/1997 |

OTHER PUBLICATIONS

English Language Translation of JP 09-222504.
Notifice of International Preliminary Examination Report (PCT/IPEA/416) and International Preliminary Examination Report (Form PCT/IPEA/409) along with English Language Notification of Transmittal of Copies of Translation of the International Preliminary Examination Report (Form PCT/IB/338) and English Language Translation of International Preliminary Examination Report (Form PCT/IPEA/409) for PCT/EP02/13846.
International Search Report (PCT/IPEA/210) and along with English Language Translation of International Search Report (Form PCT/IPEA/210) for PCT/EP02/13846.
International Search Report (PCT/IPEA/210) along with English Language Translation of International Search Report (Form PCT/IPEA/210) for PCT/EP03/02676.
International Preliminary Examination Report (Form PCT/IPEA/409) along with English Language Translation of International Preliminary Examination Report (Form PCT/IB/409 ) for PCT/EP03/00020.
International Search Report (PCT/IPEA/210) and along with English Language Translation of International Search Report (Form PCT/IPEA/210) for PCT/EP03/00020.

* cited by examiner

*Primary Examiner*—John A. McPherson
(74) *Attorney, Agent, or Firm*—Sterne, Kessler, Goldstein & Fox P.L.L.C.

(57) ABSTRACT

The invention relates to an alternative composite mask that is substantially composed of a transparent support film coated with a transparent polymer matrix that contains light-absorbing pigment particles or metal particles having an average particle size $d_{50}$ ranging between 0.5 and 10 μm.

19 Claims, No Drawings

COMPOSITE MASK FOR PRODUCING A DIFFUSER

This application is a United States National Stage Patent Application under 35 U.S.C. § 371 of International Patent Application No. PCT/EP02/13846, filed Dec. 6, 2002, which claims priority to German Patent Application No. 101 61 200.1, filed Dec. 13, 2001.

The present invention is described in the German priority application No. 10161200.1, filed Dec. 13, 2001, which is hereby incorporated by reference as is fully disclosed herein.

The present invention describes an alternative to the photomasks used hitherto for the production of diffuser films.

According to WO 94/29768 and EP-A-0 671 638, diffuser films are produced by laminating a light-sensitive, transparent material (photo-polymer, photonanomer) onto a photographic plate (mask) and exposing this material to convergent UV radiation through the latter. The photo-polymer or photonanomer contains monomers or nanoscale particles which diffuse from adjacent, unexposed areas into exposed areas of the light-sensitive, transparent material. Materials of this type are described, for example, in WO 97/38333. The mask itself consists of photogelatine on a glass layer and has been produced in advance by a complex laser-writing process with subsequent wet-chemical development and fixing (black/white photography method). This process is very time-consuming and expensive. The writing process and the subsequent further processing are susceptible to flaws (point defects), which are transferred into the end product (diffuser). The mask material (gelatine) has very high mechanical and chemical sensitivity, which limits the service life of the mask. The maximum mask format that is technically possible is currently only about 30 cm×40 cm, and continuous masks are not available, which hinders the further conversion of the diffuser into large-area display films.

The invention therefore had the object of finding an inexpensive alternative to photomasks which can be scaled up to greater widths (for example 0.60 m or 1.20 m) without major technical effort and are continuous.

The object has been achieved by a novel composite mask which consists of a finely divided, light-absorbent pigment or finely divided metal particles in a transparent matrix which has been applied as a thin coating to a trans-parent plastic film.

The invention therefore relates to a composite mask essentially consisting of a transparent support film which has been coated with a transparent polymer matrix and light-absorbent pigment particles or metal particles present therein having a mean particle size $d_{50}$ of between 0.5 and 10 µm, preferably between 1 and 5 µm, particularly preferably between 2 and 4 µm.

Suitable pigments are all finely pulverulent materials which are opaque to the light used for diffuser production, preferably UV/VIS light having a wavelength of from 190 to 500 nm. The particle size of the pigment depends on the mask structure to be produced.

Suitable pigments are inorganic and organic pigments in said particle size. Suitable organic pigments are, for example, monoazo, disazo, laked azo, β-naphthol, naphthol-AS, benzimidazolone, disazo condensation, azo metal complex pigments and polycyclic pigments, such as, for example, phthalo-cyanine, quinacridone, perylene, perinone, thiazineindigo, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments, or carbon black pigments or graphite.

Suitable inorganic pigments are, for example, metal oxides, such as, for example, antimony oxide, bismuth oxide, lead oxide, cadmium oxide, chromium oxides, cobalt oxide, iron oxides, indium oxides, copper oxides, manganese oxides, nickel oxide, mercury oxides, titanium dioxide, zinc oxide, tin dioxides and zirconium dioxide;

metal sulfides, such as, for example, cadmium sulfide, molybdenum sulfide, mercury sulfide, silver sulfide and zinc sulfide;

metal sulfates, such as, for example, barium sulfate, calcium sulfate, cobalt sulfate and strontium sulfate;

metal carbonates, such as, for example, barium carbonate, lead carbonate, calcium carbonate, strontium carbonate and zinc carbonate;

chromates, such as, for example, lead chromate and zinc chromate;

and spinels of the general formula $AB_2X_4$, where A can be a divalent metal, such as, for example, Fe(II), Zn, Mn, Co, Ni, Cu or Cd; B can be a trivalent metal, such as, for example, Al, Fe(III), V, Cr or Ti, and X can be the element O, S or Se, such as, for example, copper chromium oxides, cobalt aluminum oxides and cobalt chromium oxides.

Further suitable inorganic pigments are, for example, barium titanate, Berlin Blue, bismuth vanadate, chromium antimony titanium oxide, Manganese Violet, Molybdenum Blue, Molybdate Red, sulfur, titanium nitride, ultra-marine or Tungsten Blue.

Suitable metal particles are, for example, elements such as antimony, bismuth, lead, cadmium, chromium, cobalt, iron, gold, indium, iridium, copper, magnesium, manganese, molybdenum, nickel, osmium, palladium, platinum, rhodium, ruthenium, sarmarium, selenium, silver, silicon, tantalum, titanium, vanadium, tungsten, zinc, tin, zirconium or alloys, such as bronze, brass or steel.

Particular preference is given to graphite and carbon black.

The pigments and metal particles are obtained in said particle size by, for example, grinding and/or sieving of corresponding pigments, crude pigments or metal particles to the desired degree of fine division.

Suitable polymer matrix formers are preferably polymers from the group consisting of polyvinyl acetates, polyvinyl alcohols, polyvinylbutyrals, poly-acrylates, polymethacrylates, polyepoxides and polyvinylpyrrolidone, which may also contain corresponding oligomers and/or monomers.

The polymer matrix may also contain conventional plastics additives, such as, for example, flow-control agents, plasticizers, preferably polyalkylene glycols, crosslinking initiators, sensitizers, antioxidants and solvents, such as, for example, ketones, ethers, amides, alcohols and water.

The particularly preferred matrix material is polyvinyl alcohol dissolved in water.

The dynamic viscosity of the polymer matrix is preferably in the range between 50 and 1000 mPas, in particular between 100 and 500 mPas, measured using a rotational viscometer at 25° C. and a rotational speed of 200 $s^{-1}$.

In order to prepare the polymer matrix, the polymer is dissolved in a solvent which is suitable for this purpose, such as, for example, water, monohydric or polyhydric alcohols, ethers and esters thereof, for example alkanols having from 1 to 4 carbon atoms, such as, for example, methanol, ethanol, propanol, isopropanol, butanol or isobutanol; dihydric or trihydric alcohols, in particular having from 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol and poly-propylene glycol; lower alkyl ethers of polyhydric alcohols, such as, for example, ethylene glycol monomethyl or monoethyl or monopropyl or monobutyl ether, ethylene glycol dimethyl or diethyl or dipropyl or dibutyl ether, diethylene glycol monomethyl or monoethyl ether, diethylene glycol dimethyl or diethyl ether, triethylene glycol monomethyl or monoethyl ether, triethylene glycol dimethyl or diethyl ether, propylene glycol monomethyl or monoethyl or monopropyl or monobutyl ether, propylene glycol dimethyl or diethyl or dipropyl or dibutyl ether, dipropylene glycol monomethyl or mono-ethyl or monobutyl ether, dipropylene glycol dimethyl or diethyl or dibutyl ether; cyclic ethers, such as tetrahydrofuran, dioxalane or dioxane; ethers, such as tert-butyl methyl ether or diethyl ether; ketones and ketone alcohols, such as, for example, acetone, methyl ethyl ketone, diethyl ketone, methyl isobutyl ketone, methyl pentyl ketone, cyclopentanone, cyclohexanone and diacetone alcohol; esters, such as, for example, methyl or ethyl or propyl or butyl acetate, methyl or ethyl or propyl or butyl propanoate, butyrolactone, or methyl or ethyl lactate; amides, such as, for example, dimethylformamide, dimethylacetamide and N-methylpyrrolidone; aromatic compounds, such as toluene or xylene; chlorinated hydrocarbons, such as chloroform or methylene chloride; acetonitrile, and mixtures thereof.

A plasticizer is preferably added to the polymer solution, increasing the flexibility of the mask and reducing shrinkage of the matrix during drying so that cavities, which result in undesired light scattering, cannot form in the dried matrix material.

Particularly preferred plasticizers are diethylene glycol and polyethylene glycols.

The pigment particles or metal particles must be homogeneously dispersed in the polymer matrix. To this end, use is made of known dispersion aids, such as, for example, dissolvers, stirrers, compounders and other conventional dispersion units. In addition, solvents, wetting assistants, emulsifiers and dispersants, such as, for example, anionic, cationic or non-ionic surfactants, can additionally be used in order to set the viscosity and surface tension of the matrix in accordance with the requirements of the film coating method used.

The optical properties of the mask (and thus those of the diffuser to be produced therefrom) can be adjusted via the particle size of the pigment or metal, via the volume proportion of the pigment in the mask and via the layer thickness of the polymer matrix.

The proportion by volume of the pigment in the matrix is preferably from 0.5 to 10% by volume, in particular from 1 to 5% by volume, based on the total volume of the matrix including pigment or metal particle.

The layer thickness of the polymer matrix is preferably from 1 to 20 µm, in particular from 2 to 10 µm.

The support film used is a plastic film, which must be transparent to the light used for the production of the diffuser. Preference is given to films made from polyester, cellulose acetate, polycarbonate, polypropylene, polyethylene and polymethyl methacrylate. Particular preference is given to films made from polyethylene terephthalate.

The layer thickness of the support film is preferably from 10 to 200 µm, in particular from 20 to 150 µm, particularly preferably from 30 to 100 µm.

The invention also relates to a process for the production of a composite mask, which comprises dispersing a pigment or metal particles of said particle size in a polymer matrix solution, coating a support film with the resultant mixture, and subsequently drying the coating.

The coating of the support film can be carried out using commercially available film-coating units by the knife-coating method, preferably at a feed rate of from 0.5 to 5 m/min. The drying is advantageously carried out at a temperature of from 60 to 150° C.

The invention also relates to the use of a composite mask for the production of a diffuser. To this end, the composite mask is laminated onto a film made from a photopolymeric material, the photopolymeric material is exposed to convergent UV/VIS light through the composite mask in order to produce changes in the refractive index of the photopolymeric material, causing the formation of microdomains with a refractive index graduation which correspond to the spot pattern of the composite mask and which are subsequently cured by UV irradiation, and delaminating the resultant diffuser from the composite mask again. A process of this type is described, for example, in EP-A-0 671 638. The diffuser itself can be used for display films (passive waveguide systems; increase in the viewing angle) and in architectural glass.

Preparation of a Polyvinyl Alcohol Mixture:

a) Dissolution of ®Mowiol 18-88 (Clariant): 4050 g of deionized $H_2O$ were introduced into a 5 l reactor. 450 g of Mowiol 18-88 were slowly added with stirring (propeller stirrer, about 250 rpm). The mixture was stirred in the reactor for about 3 days with the temperature being held at 80° C. (reflux condenser).

b) Preparation of a PVA Mixture:

200 g of diethylene glycol and subsequently 359 g of i-PrOH were added with stirring (anchor stirrer, about 250 rpm) to 2000 g of the PVA (=10% of Mowiol 18-88 in water) as described in a).

Preparation of Graphite Mixture:

1.3 g of TWEEN 80 (emulsifier from Merck) were added with stirring (magnetic stirrer with magnetic bar, 300-400 rpm) to 200 g of deionized $H_2O$. After dissolution of the emulsifier, 12.8 g of graphite KS 4 from Timca were added slowly (12.8 g of graphite in about 5.30 minutes), likewise with stirring. The mixture was subsequently stirred for a further 10 minutes and then treated with an ultrasound lance.

Production of the Graphite/Polymer Matrix:

32.5 g of graphite mixture were added with stirring (anchor stirrer, about 250 rpm) to 225 g of the PVA mixture. 37.5 g of iso-PrOH, 37.5 g of EtOH and 3.3 g of ®Byk 306 were added successively with stirring as further components.

Coating Process:

The graphite/polymer matrix was applied to a commercially available polyester film (thickness 50 µm) using a film-coating unit (Mathis, width 600 mm) by the knife-coating method at a feed rate of 2 m/min and dried at 120° C. (drying time 1.5 min) to give a composite mask.

Use of the Composite Mask:

The composite mask was laminated onto commercially available photo-polymer, as described, for example, in WO 94/29768, and irradiated with UV light (Hg lamp with cold-light mirror 350-450 nm, 2 min, 1860 ft cd) for 2 minutes in a mask aligner and subsequently fixed for 1 minute by UV irradiation over the entire area. This gave a diffuser film (viewing angle of 16°) which has very good optical concordance compared with a diffuser film (viewing angle of 19°) produced by means of conventional photomasks, as described in WO 94/29768.

In order to determine the viewing angle, the diffuser film is illuminated with convergent light from one side (perpendicular direction of incidence), and the intensity I of the transmitted light is measured using a photodetector as a function of the angle α. The angle α ($-90°<=α<=90°$) here denotes the deviation from the perpendicular. The viewing angle corresponds to the half-value width ½. The greater the viewing angle, the greater the scattering power of the material.

The invention claimed is:

1. A method for the production of a diffuser for display films and architectural glass, the method comprising:
   providing a transparent support film;
   coating the transparent support film with a transparent polymer matrix containing light-absorbent pigment particles or metal particles having a mean particle size $d_{50}$ of between 0.5 and 10 µm to thereby provide a composite mask;
   laminating the composite mask with a photopolymeric material;
   exposing the photopolymeric material to convergent light through the composite mask to produce a patterned photopolymeric material having a refractive index gradient corresponding to the particles present in the composite mask;
   curing the patterned photopolymeric material to provide the diffuser; and
   delaminating the diffuser from the composite mask.

2. The method of claim 1, wherein the pigment particles have a mean particle size $d_{50}$ of between 1 and 5 µm.

3. The method of claim 1, wherein the pigment particles are organic pigments.

4. The method of claim 3, wherein the organic pigment is selected from group consisting of a monoazo, disazo, laked azo, β-naphthol, naphthol AS, benzimidazolone, disazo condensation, azo metal complex pigment or a phthalocyanine, quinacridone, perylene, perinone, thiazineindigo, thioindigo, anthranone, anthraquinone, flavanthrone, indanthrone, isoviolanthrone, pyranthrone, dioxazine, quinophthalone, isoindolinone, isoindoline or diketopyrrolopyrrole pigment, a carbon black pigment or graphite.

5. The method of claim 1, wherein the pigment particles are inorganic pigments.

6. The method of claim 5, wherein the inorganic pigment is selected from the group consisting of an antimony oxide, bismuth oxide, lead oxide, cadmium oxide, chromium oxide, cobalt oxide, iron oxide, indium oxide, copper oxide, manganese oxide, nickel oxide, mercury oxide, titanium dioxide, zinc oxide, tin dioxide, zirconium dioxide, cadmium sulfide, molybdenum sulfide, mercury sulfide, silver sulfide, zinc sulfide, barium sulfate, calcium sulfate, cobalt sulfate, strontium sulfate, barium carbonate, lead carbonate, calcium carbonate, strontium carbonate, zinc carbonate, lead chromate, zinc chromate, copper chromium oxide, cobalt aluminum oxide, cobalt chromium oxide, barium titanate, Berlin Blue, bismuth vanadate, chromium antimony titanium oxide, Manganese-Violet, Molybdenum Blue, Molybdate Red, sulfur, titanium nitride, ultramarine or Tungsten Blue pigment.

7. The method of claim 1, wherein the metal particles are selected from the group consisting of antimony, bismuth, lead, cadmium, chromium, cobalt, iron, gold, indium, iridium, copper, magnesium, manganese, molybdenum, nickel, osmium, palladium, platinum, rhodium, ruthenium, samarium, selenium, silver, silicon, tantalum, titanium, vanadium, tungsten, zinc, tin, zirconium, bronze, brass or steel particles.

8. The method of claim 1, wherein the polymer matrix is selected from the group consisting of polyvinyl acetate, polyvinyl alcohol, polyvinylbutyral, polyacrylate, polymethacrylate, polyepoxide, polyvinylpyrrolidone, which may also contain oligomers and/or monomers thereof, or a mixture thereof.

9. The method of claim 1, wherein the support film is selected from the group consisting of polyester, cellulose acetate, polycarbonate, polypropylene, polyethylene or polymethyl methacrylate.

10. The method of claim 1, wherein the proportion by volume of the pigment or metal particles in the matrix is from 0.5 to 10% by volume, based on the total volume of the matrix, including pigment or metal particles.

11. The method of claim 1, wherein the pigment particles or metal particles have a mean particle size $d_{50}$ of between 2 and 4 µm.

12. The method of claim 11, wherein the pigment particles are organic pigments.

13. The method of claim 12, wherein the organic pigment is selected from group consisting of a monoazo, disazo, laked azo, β-naphthol, naphthol AS, benzimidazolone, disazo condensation, azo metal complex pigment or a phthalocyanine, quinacridone, perylene, perinone, thiazineindigo, thioindigo, anthranone, anthraquinone, flavanthrone, indanthrone, isoviolanthrone, pyranthrone, dioxazine, quinophthalone, isoindolinone, isoindoline or diketopyrrolopyrrole pigment, a carbon black pigment or graphite.

14. The method of claim 11, wherein the pigment particles are inorganic pigments.

15. The method of claim 14, wherein the inorganic pigment is selected from the group consisting of an antimony oxide, bismuth oxide, lead oxide, cadmium oxide, chromium oxide, cobalt oxide, iron oxide, indium oxide, copper oxide, manganese oxide, nickel oxide, mercury oxide, titanium dioxide, zinc oxide, tin dioxide, zirconium dioxide, cadmium sulfide, molybdenum sulfide, mercury sulfide, silver sulfide, zinc sulfide, barium sulfate, calcium sulfate, cobalt sulfate, strontium sulfate, barium carbonate, lead carbonate, calcium carbonate, strontium carbonate, zinc carbonate, lead chromate, zinc chromate, copper chromium oxide, cobalt aluminum oxide, cobalt chromium oxide, barium titanate, Berlin Blue, bismuth vanadate, chromium antimony titanium oxide, Manganese Violet, Molybdenum Blue, Molybdate Red, sulfur, titanium nitride, ultramarine or Tungsten Blue pigment.

16. The method of claim 11, wherein the metal particles are selected from the group consisting of antimony, bismuth, lead, cadmium, chromium, cobalt, iron, gold, indium, iridium, copper, magnesium, manganese, molybdenum, nickel, osmium, palladium, platinum, rhodium, ruthenium, samarium selenium, silver, silicon, tantalum, titanium, vanadium, tungsten, zinc, tin, zirconium, bronze, brass or steel particles.

17. The method of claim 11, wherein the polymer matrix is selected from the group consisting of polyvinyl acetate, polyvinyl alcohol, polyvinylbutyral, polyacrylate, polymethacrylate, polyepoxide, polyvinylpyrrolidone, which may also contain oligomers and/or monomers thereof, or a mixture thereof 18. The method of claim 11, wherein the support film is selected from the group consisting of polyester, cellulose acetate, polycarbonate, polypropylene, polyethylene or polymethyl methacrylate.

19. The method of claim 11, wherein the proportion by volume of the pigment or metal particles in the matrix is from 0.5 to 10% by volume, based on the total volume of the matrix, including pigment or metal particles.

* * * * *